(12) United States Patent
de La Chapelle

(10) Patent No.: US 7,454,202 B2
(45) Date of Patent: Nov. 18, 2008

(54) LOW DATA RATE MOBILE PLATFORM COMMUNICATION SYSTEM AND METHOD

(75) Inventor: Michael de La Chapelle, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 668 days.

(21) Appl. No.: 10/915,170

(22) Filed: Aug. 10, 2004

(65) Prior Publication Data
US 2006/0035588 A1    Feb. 16, 2006

(51) Int. Cl.
*H04Q 7/20* (2006.01)

(52) U.S. Cl. .................... 455/427; 455/431; 455/456.1; 455/13.3

(58) Field of Classification Search ................ 455/427, 455/428, 429, 430, 431, 432.1, 456.1, 13.3, 455/12.1, 446, 447, 450, 454, 13.1, 9, 11.1; 342/367, 74, 81; 343/700, 844
See application file for complete search history.

(56) References Cited

U.S. PATENT DOCUMENTS

| | | | |
|---|---|---|---|
| 4,939,527 A | 7/1990 | Lamberty et al. | |
| 5,027,124 A | 6/1991 | Fitzsimmons et al. | |
| 5,276,455 A | 1/1994 | Fitzsimmons et al. | |
| 5,678,171 A | 10/1997 | Toyama et al. | |
| 5,886,671 A | 3/1999 | Riemer et al. | |
| 6,061,562 A * | 5/2000 | Martin et al. | 455/431 |
| 6,643,509 B1 * | 11/2003 | Crow | 455/431 |
| 6,708,029 B2 * | 3/2004 | Wesel | 455/428 |
| 6,741,841 B1 * | 5/2004 | Mitchell | 455/12.1 |
| 6,781,968 B1 * | 8/2004 | Colella et al. | 455/431 |
| 2002/0087992 A1 | 7/2002 | Bengeult et al. | |
| 2004/0102191 A1 * | 5/2004 | Pewitt et al. | 455/431 |

* cited by examiner

Primary Examiner—John J Lee
(74) Attorney, Agent, or Firm—Harness, Dickey & Pierce, P.L.C.

(57) ABSTRACT

A method is provided for providing communication and surveillance services to a mobile platform. The method includes substantially simultaneously communicating between a plurality ground based antennas and a plurality of satellites. Particularly, each ground based antenna communicates with a related one of the satellites. The method additionally includes substantially simultaneously communicating between each of the satellites and at least one multi-faceted electronically scanned antenna included in a mobile platform communication system onboard a mobile platform.

24 Claims, 5 Drawing Sheets

LOW DATA RATE MOBILE PLATFORM COMMUNICATION SYSTEM AND METHOD

FIELD

The present disclosure relates generally to a mobile platform communication system. More particularly the present disclosure relates to a low data rate communication system and method that provides communication and surveillance services to a mobile platform.

BACKGROUND

Broadband satellite communication services are becoming more readily available to users onboard mobile platforms such as aircraft, ships, trains, buses, automobiles, etc. Generally, such broadband services require relatively large, heavy and expensive antennas mounted to the mobile platform. These large broadband antennas cannot practically or affordably be carried on smaller, light weight mobile platforms. In addition, many smaller mobile platforms do not require broadband connectivity, but instead an inexpensive, small and reliable communication system would be more suitable. That is, smaller mobile platforms may merely need a communication system that will provide low data rate messaging and/or the capability for the mobile platform to be tracked, e.g. geolocated.

For example, smaller mobile platforms may find it useful to employ a satellite based communication system that provides two-way, narrowband communication for general messaging and safety critical communications using small, light weight, low power and low cost antennas that have high reliability. Such narrowband communication system are typically only implemented at frequencies below 2 GHz and are only utilized to provide such services as text messaging, aeronautical information for flight safety, weather reports, and limited web surfing.

Additionally, regulatory requirements have generally prevented the use of wide beamwidth satellite communication antennas because of interference with adjacent satellites that occurs. For example, when communication with satellites at C-band and Ku-band, FCC and ITU regulations generally require the diameter of the antennas to respectively be at least three meters and one meter. With these size antennas, broadband communication at approximately 2-30 Mbs can be achieved, but the size of the antennas is far too large for many mobile platform.

Therefore, it would be desirable to provide a communication system capable of providing low data rate messaging and/or surveillance, i.e. geolocation and tracking, services onboard smaller mobile platforms. Moreover, it would be desirable to provide a satellite communication system for mobile platforms that offers the benefits of small, inexpensive antennas at operating frequencies that correspond to the principal commercial satellite communication bands above 2 GHz.

BRIEF SUMMARY

A method for providing communication and surveillance services to a mobile platform is provided in accordance with various forms of the present disclosure. The method includes substantially simultaneously communicating between a plurality ground based antennas and a plurality of satellites. Particularly, each ground based antenna communicates with a related one of the satellites. The method additionally includes substantially simultaneously communicating between each of the satellites and at least one multi-faceted electronically scanned antenna included in a mobile platform communication system onboard a mobile platform.

In various implementations, the mobile platform communication system includes at least one multi-faceted electronically scanned phased array (MESPA) antenna that includes a plurality of facets and a plurality of patch elements on each of the facets. The MESPA antenna substantially simultaneously communicates with a plurality of satellites either by simultaneously activating multiple facets of the MESPA or by scanning a beam from a single facet of the MESPA to a location approximately mid-way between two of the satellites. By encompassing multiple satellites with multiple beams from different facets or a single beam from a single facet, the mobile platform communication system can substantially simultaneously communicate redundant data signals between the MESPA antenna and two or more satellites. This achieves the dual purpose of increasing reliability and enabling geolocation through triangulation.

The features, functions, and advantages of the present disclosure can be achieved independently in various embodiments of the present disclosure or may be combined in yet other embodiments.

BRIEF DESCRIPTION OF THE DRAWINGS

The present disclosure will become more fully understood from the detailed description and accompanying drawings, wherein.

Corresponding reference numerals indicate corresponding parts throughout the several views of drawings.

DETAILED DESCRIPTION

The following description of various exemplary embodiments is merely exemplary in nature and is in no way intended to limit the present disclosure, its application or uses. Additionally, the advantages provided by the various embodiments, as described below, are exemplary in nature and not all embodiments provide the same advantages or the same degree of advantages.

Figure 1A:
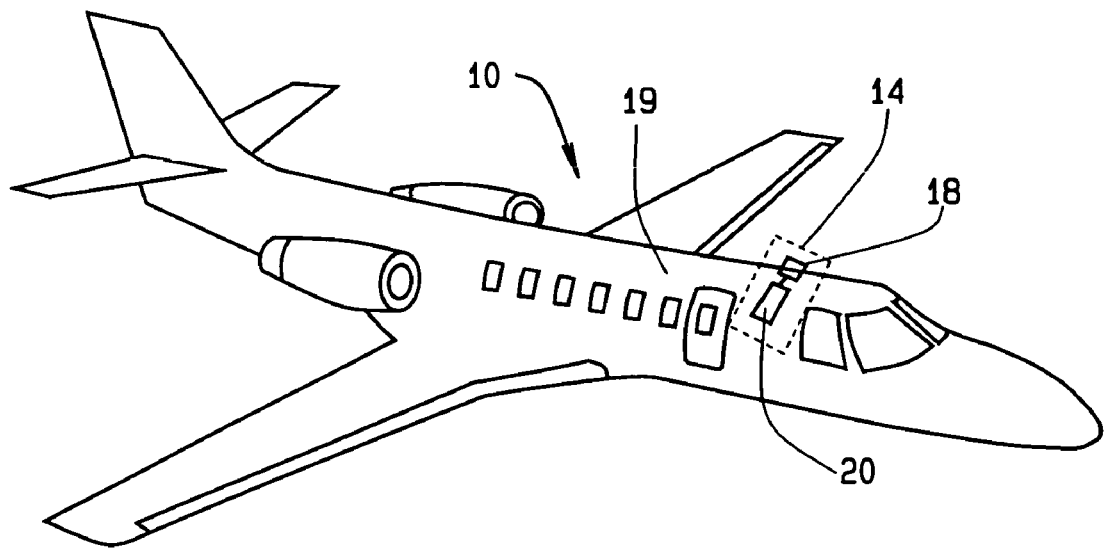
FIG. 1A is an illustration of a mobile platform incorporating a mobile platform communications system having an antenna mounted to a fuselage of the mobile platform, in accordance with various embodiments of the present disclosure.
Figure 1B:
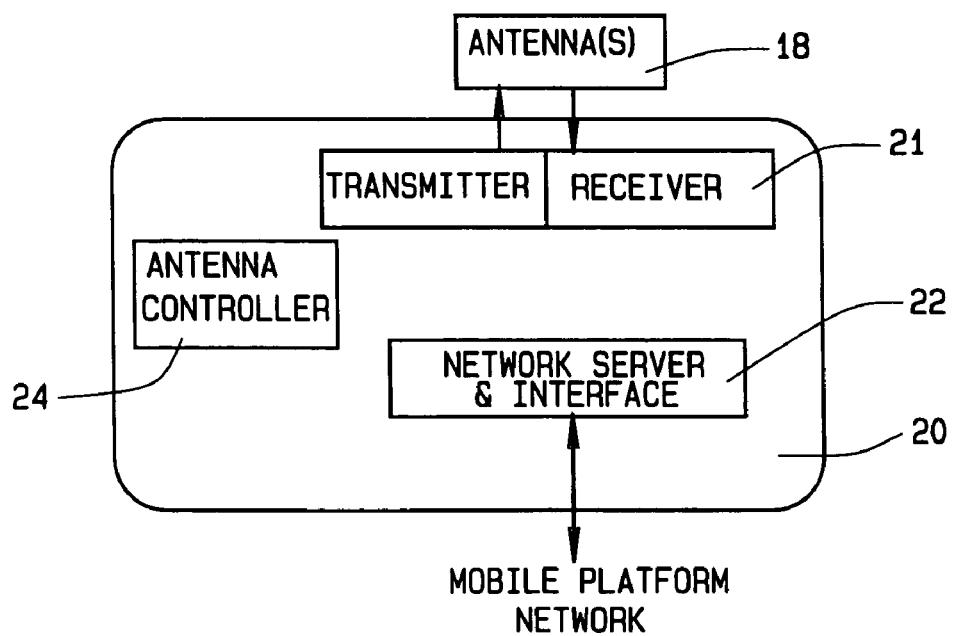
FIG. 1B is an block diagram of a mobile platform terminal electronic subsystem, shown in FIG. 1A.

FIG. 1A is an illustration of a mobile platform 10 incorporating a mobile platform terminal 14 having at least one mobile platform antenna 18 mounted to a fuselage 19 of the mobile platform, in accordance with various embodiments of the present disclosure. Although the mobile platform 10 is shown as an aircraft, the mobile platform 10 could also be represented in the form of other mobile platforms, such as a ship, a train, a bus or an automobile. The mobile platform terminal 14 is a subsystem of a communications system described below with respect to FIG. 2. In addition to the mobile platform antenna(s) 18 the mobile platform terminal 14 includes an electronic subsystem 20 illustrated in FIG. 1B in block diagram form. The mobile platform terminal electronic subsystem 20 includes various other components utilized in association with the operation of the mobile platform antenna(s) 18, such as a transceiver 21, a mobile platform network server and interface 22 and an antenna beam steering controller 24. In various implementations, the mobile platform antenna(s) 18 is/are multi-faceted electronically scanned antennas.

Figure 2:
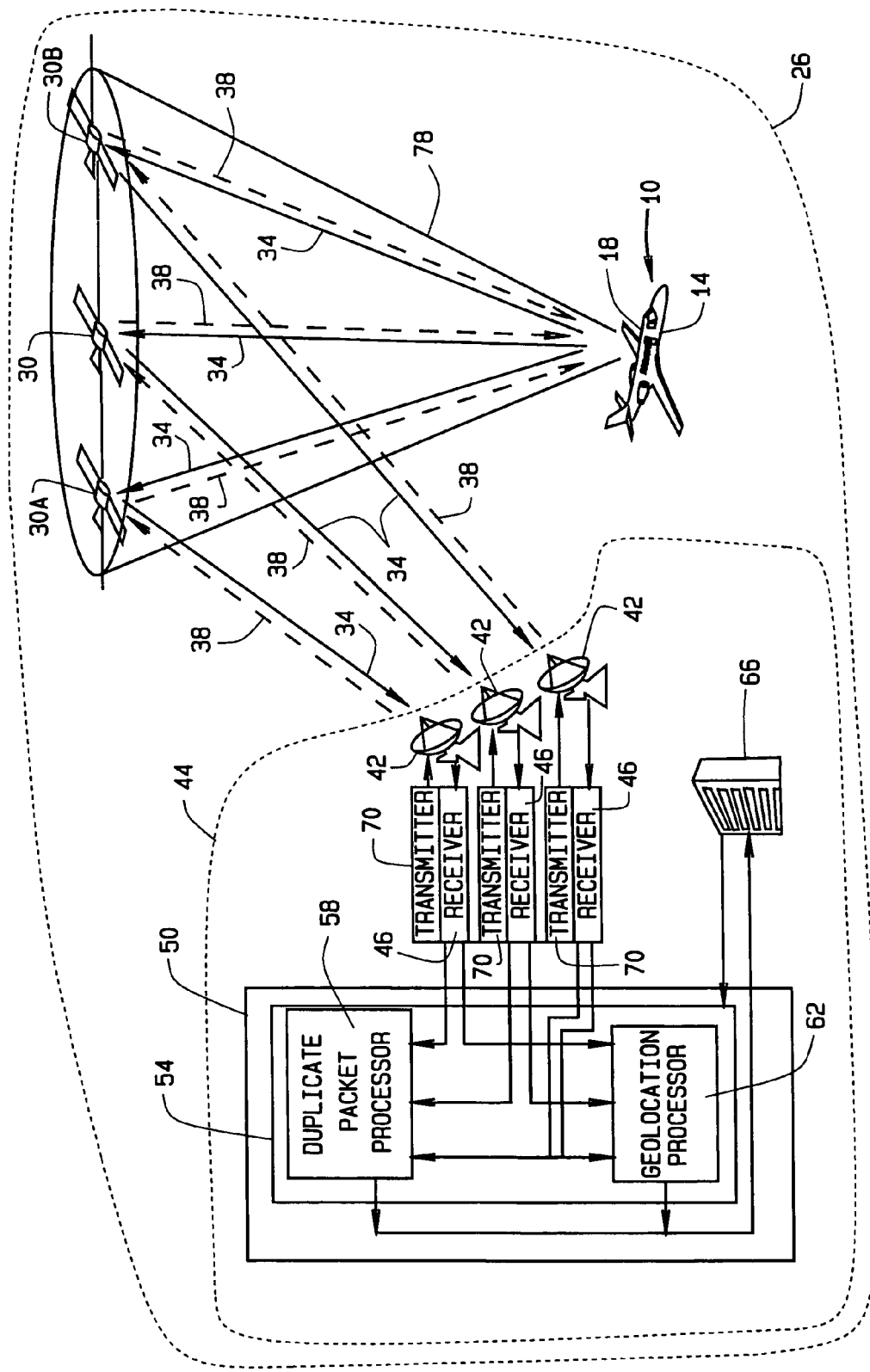
FIG. 2 is an illustration of a communication system that includes the mobile platform communications system shown in FIG. 1 for providing communication and surveillance to a mobile platform.

FIG. 2 is an illustration of a communication system 26 for providing communication and surveillance to a mobile platform. The communication system 26 includes the mobile platform terminal 14, shown in FIG. 1. The communication system 26 additionally includes a plurality of satellites 30 that transpond return link signals 34 and forward link signals 38 between the mobile platform terminal 14 and a plurality of ground based antennas 42. The ground based antennas 42 are part of a satellite ground station 44 that also includes other components, described below, that are communicatively connected to the ground based antennas 42, e.g. wirelessly, electrically or optically hard wired, etc.

In various embodiments the return link signals 34 and the forward link signals 38 are redundant signals. That is, each return link signal 34 and forward link 38 includes substantially the same data and/or information transmitted substantially simultaneously between the mobile platform terminal 14 and the ground based antennas 42, via the satellites 30. Thus, each mobile platform communicates simultaneously with more than one satellite, thereby enabling more reliable communication (redundant paths) and the ability to geolocate (by triangulating off of multiple satellites).

In the case of return link signals 34, the mobile platform terminal 14 generates and substantially simultaneously transmits the return link signals 34 to each of the satellites 30, via the mobile platform antenna(s) 18. In various embodiments, the mobile platform antenna(s) 18 is/are multi-faceted electronically scanned phased array (MESPA) antenna(s), described below in greater detail. The return link signals 34 are transponded through the satellites 30 to the ground based antennas 42. The ground based antennas 42 output signals to a plurality of receivers 46 that are communicatively connected to at least one ground substation 50 included in the satellite ground station 44. Although FIG. 2 illustrates that the receivers 46 communicate with a single ground substation 50, it should be understood that the satellite ground station 44 could include a plurality of ground substations 50 whereby the receivers 46 could communicate with more than one ground substation 50, and remain within the scope of the present disclosure. Additionally, it should be understood that each ground based antenna 42 and associated receiver 46 could be located remotely from one or more ground substations 50 and/or communicate with separate ground substations 50, and remain within the scope of the present disclosure.

The receivers 46 process the signals output from the ground based antennas 42 and convey the processed signals to a ground station server 54 included in the ground substation 50. If more than one ground substation 50 is included in the satellite ground station 44, the processed signals from each receiver 46 are conveyed to one centralized ground station server 54. The ground station server 54 includes a duplicate packet processor 58 and a geolocation processor 62. The duplicate packet processor 58 compiles message data included in the return link signals 34 and processed by the receivers 46, as described in further detail below. The geolocation processor 62 utilizes geolocation data included in the return link signals 34 and processed by the receivers 46 to triangulate a position of the mobile platform 10, as described in further detail below. The ground station server 54 communicates with a network operations center (NOC) 66. Substantially simultaneously transmitting redundant return link signals 34 enables more reliable communication and the ability to geolocate the mobile platform 10 by triangulating the position using multiple satellites. Additionally, the satellites 30 are in different orbital slots and cover different operational regions on the earth to provide increased reliability and geolocation capability.

In the case of forward link signals 38, in various embodiments, the ground substation(s) 50 communicate(s) with a plurality of transmitters 70 that substantially simultaneously transmit the forward link signals to the satellites 30, via the ground based antennas 42. The forward link signals 38 are substantially identical and are transponded by the satellites 30 to the mobile platform terminal 14. The forward link signals 38 are received by the mobile platform antenna(s) 18, preferably multi-facets electronically scanned phased array (MESPA) antenna(s), as described below. A receiver 21 of the mobile platform terminal 14 determines which receive data stream to accept, based on a measure of receive signal quality (Eb/No) output from the receiver 21.

Alternatively, the communication system 26 can transmit the forward link signals as described in U.S. patent application Ser. No. 09/989,742, titled "Method and Apparatus for Providing Bi-Directional Data Services and Live Television Programming to Mobile Platforms", filed Nov. 20, 2001, and assigned to the Boeing Company, except that the data transfer rates are much lower utilizing the mobile platform antenna(s) 18 of the present disclosure, as described below. To minimize size, weight, power and cost of the mobile platform terminal 14, a single receiving mobile platform antenna 18, as described below, would function well. However, to optimize performance and increase reliability, two receiving mobile platform antennas 18 can be employed in the mobile platform terminal 14. The wide receive beam of the mobile platform antenna(s) 18, as described below, allows the mobile platform terminal 14 to substantially simultaneously receive the transponded forward link signals 38 from satellites 30.

Figure 3A:
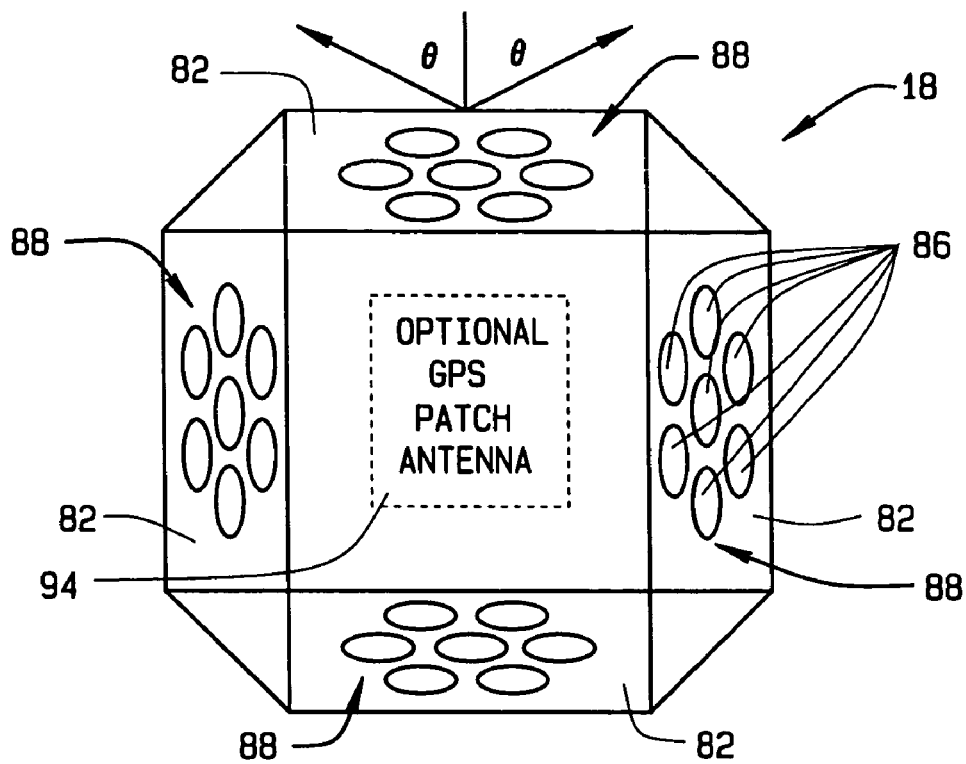
FIG. 3A is a top view of an antenna shown in FIG. 1, in accordance with various embodiments of the present disclosure.
Figure 3B:
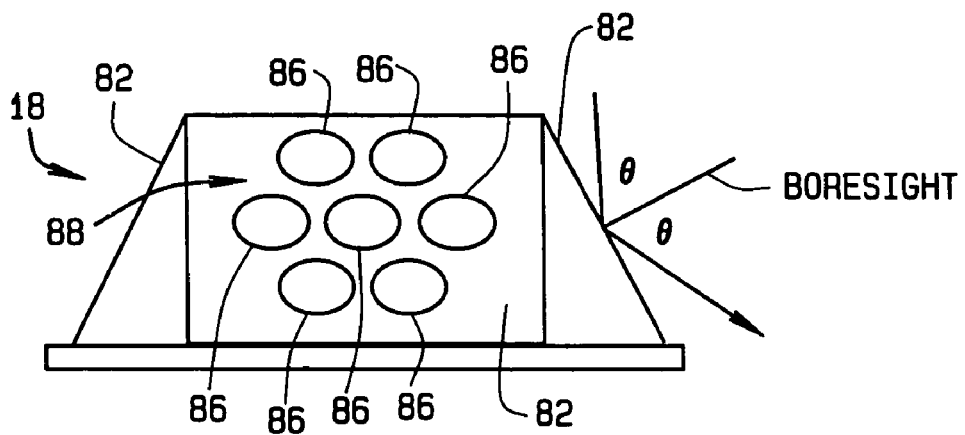
FIG. 3B is a side view of the antenna shown in FIG. 3A.

FIGS. 3A and 3B are respectively a top and side view of the mobile platform antenna 18 in accordance with various embodiments of the present disclosure. As described above, the mobile platform terminal 14 includes at least one mobile platform antenna 18. In various embodiments, the mobile platform terminal 14 includes a receive mobile platform antenna 18 and a transmit mobile platform antenna 18. In other various embodiments the mobile platform terminal 14 includes a single mobile platform antenna 18 adapted to transmit and receive the return link and forward link signals 34 and 38 to and from the satellites 30. Regardless of the embodiment, the mobile platform antenna(s) 18 are substantially the same with regard to the inventive features of the present disclosure, with only slight variations in certain electrical components, as described below. Therefore, for clarity and simplicity, the mobile platform antenna(s) 18 will be described herein with respect to a single mobile platform antenna 18, with the understanding that the inventive features described are applicable to a transmit mobile platform antenna 18, a receive antenna mobile platform 18 and a transmit/receive mobile platform antenna 18.

As illustrated in FIG. 1, each antenna mobile platform 18 is mounted on the top of the mobile platform fuselage 19 to achieve an unobstructed view of the satellites 30. Preferably, each mobile platform antenna 18 is lightweight and small, having a low frontal area to minimize aerodynamic drag. As described above, in various embodiments each mobile platform antenna 18 is a MESPA antenna. Each MESPA antenna 18 is communicatively connected to a beam steering controller 24 to scan antenna transmit/receive beams, generally indicated at 78 in FIG. 2, generated by each MESPA antenna 18 to the satellites 30. In various embodiments, the beam steering controller 24 is included in the mobile platform terminal 14, as shown in FIG. 1. Alternatively, beam steering electronics can be included in each MESPA antenna 18. Each MESPA antenna 18 includes a plurality of facets 82 that provide hemispheric coverage of the antenna transmit/receive beams 78. Each facet 82 of each MESPA antenna 18 includes a plurality of antenna elements 86 that form an antenna element array 88. In various embodiments, the antenna elements 86 are patch element. However, alternatively the antenna elements 86 could be any suitable antenna element such as rectangular waveguide slot elements and circular waveguide elements.

In various forms, each MESPA antenna 18 includes four facets 82, each including seven antenna elements 86. However, it should be understood that each MESPA antenna 18 could include any number of facets 82 and arrays 88 while remaining within the scope of the present disclosure. A surface of each facet 82 is canted at a predetermined angle from horizontal. A mechanical boresight of each element array 88 is defined by a vector emanating from the center of the element array 88 and perpendicular to the surface of the respective facet 82, as illustrated in FIG. 3B. A scan angle θ is the angle between the direction of the scan, i.e. the direction a scan beam is pointing, and the mechanical boresight. Preferably, each element array 88 is capable of scanning the scan angle θ, e.g. 60°, without significant performance degradation. Thus, the plurality of facets 82, e.g. four facets 82, provides full hemispheric coverage.

The beam steering controller 24 continuously dynamically scans one or more facets 82 over a range of deviation, i.e. +/− the scan angle θ, from the boresight. In doing so, the beam steering controller 24 determines which phased array 88, i.e. facet 82, is active and steers the transmit/receive beam 78 to point approximately at a midpoint of the satellites 30 such that the transmit/receive beam 78 encompasses at least two of the satellites 30. The midpoint is a spot mid-way between the two outer most satellites 30. Alternatively, the beam steering controller 24 can steer transmit/receive beams 78 from multiple element arrays 88 toward two or more satellites 30. Each MESPA antenna 18 has the capability to electronically scan in azimuth and elevation to track the satellites 30 and also has the ability to electronically adjust polarization to match that of the satellite transponders with which it is communicating. Although each MESPA antenna 18 is illustrated in FIGS. 3A and 3B as including seven antenna elements 86 on each facet 82, each MESPA antenna 18 could incorporate any number of antenna elements 86 in each array 88 and remain within the scope of the present disclosure. The number of antenna elements 86 included in each array 88 would be determined based on such things as communication link performance, e.g. data rates and bit error rates, and antenna size, weight and cost constraints imposed by the particular MESPA antenna 18 application.

Each MESPA antenna 18 is suitable for operation within a wide range of frequencies, e.g. between 1 and 100 GHz. In various embodiments, each MESPA antenna 18 operates within the Ku-band. In other embodiments, each MESPA antenna 18 operates within the Ka-band. In still other embodiments, each MESPA antenna 18 operates within the X-band. The spacing between the array elements 86 is approximately the wavelength divided by two. Therefore, an MESPA antenna 18 operating at 14.25 GHz will be slightly smaller in size than a MESPA antenna 18 operating at approximately 12 GHz. Furthermore, each MESPA antenna 18 is smaller in size than typical known mobile platform electronically scanned phased array antennas. Therefore, the EIRP and G/T of each MESPA antenna 18 is lower than typical known mobile platform electronically scanned phased array antennas. For this reason, the data rates of the return link signals 34 and the forward link signals 38, generated by each MESPA antenna 18, as described herein, are generally low. For example, using commercially available Ku-band satellite transponders, the data rate for the return link signals 34 can be between 0.5 and 1.0 Kbps, while the data rate of the forward link signals 38 can be between 50 and 75 Kbps.

In alternate embodiments, the MESPA antenna 18, or at least one of the MESPA antennas 18 if the mobile platform terminal 14 includes a plurality of MESPA antennas 18, includes an optional GPS patch antenna 94 that can be utilized for tracking the location of the mobile platform 10, as further described below. In the embodiment wherein the mobile platform terminal 14 includes a transmit MESPA antenna 18 and a separate receiver MESPA antenna 18, the transmit MESPA antenna 18 would use transmit antenna elements 86 that incorporate power amplifiers (not shown), while the receive MESPA antenna 18 antenna elements 86 would incorporate low noise amplifiers (not shown).

Figure 4:
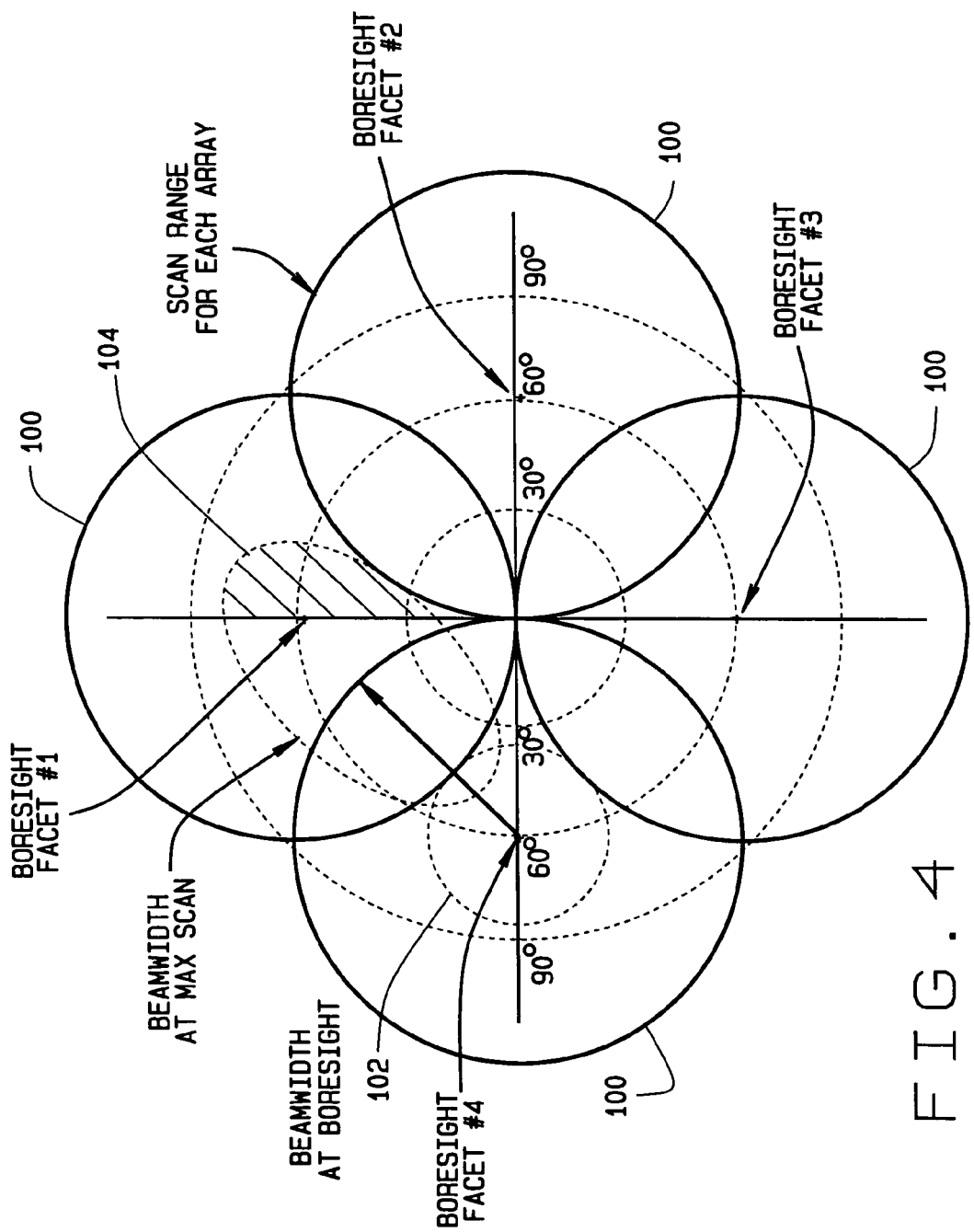
FIG. 4 is a schematic illustrating the coverage space for the antenna shown in FIGS. 3A and 3B.

FIG. 4 is a schematic illustrating the coverage space for a MESPA antenna 18 shown in FIGS. 3A and 3B. Each phased array facet 82 continuously dynamically scans a beam center over a range of deviation, i.e. +/− the scan angle θ, from the boresight, as depicted by the circles 100. For exemplary purposes and clarity of description, FIG. 4 shows θ to be equal to 60°. However, the scan angle θ could be as great as 90° such that the range of deviation would be +/−90°. The beam widths at the boresight and maximum scan angles, i.e. θ, are respectively depicted by the dashed circle 102 and the dashed ellipse 104. For simplicity and clarity, the beam width at maximum scan angle is only shown for a single facet 82. The beam of each facet 82 elongates along the scan axis as the beam center is scanned to the edge of the scan range, i.e. +/−θ. Nearly all visible scan space is encompassed within the beam width, e.g. 3 dB, when the beam center is scanned over +/−θ, e.g. 60°, from boresight.

In various embodiments the gain at the maximum scan angle can be calculated using the following equation:

$$\text{Gain @} \theta \text{ scan} = \text{Peak Gain} + 10 \log(\cos^{1.2}(\theta)),$$

wherein the peak gain is determined by:

$$\text{Peak Gain@boresight} = 10 \log(X) + 5 \text{ dB},$$

wherein X is equal to the number of antenna elements 86 on each facet 82, e.g. X is equal to seven and 5 dB is the gain of each antenna element 86.

For example, utilizing θ=60°, X=7 and the exemplary forward and return link budget tables below, the gain at the maximum scan angle can be calculated to be:

$$\text{Gain@ } 60° \text{ scan} = \text{Peak Gain} + 10 \log(\cos^{1.2}(60°)) = 9.84 \text{ dB},$$

wherein the peak gain is equal to:

$$\text{Peak Gain@ boresight} = 10 \log(7) + 5 \text{ dB} = 13.45$$

TABLE 1

Exemplary forward link budget.

| | |
|---|---|
| slant range | 39000 km |
| frequency | 12 GHz |
| wavelength | 0.025 m |
| path loss | 2.60E-21 |
| channel bit rate | 64 Kbps |
| mobile terminal G/T | −15 dB/K |
| threshold Eb/No | 2.5 dB |
| external interference | 2 dB |
| pointing loss | 1 dB |
| rain & atmospheric loss | 1 dB |
| required transponder EIRP | 46.8 dBW |

Table 1. Exemplary Forward Link Budget

TABLE 2

Exemplary return link budget.

| | |
|---|---|
| slant range | 39000 km |
| frequency | 14.25 GHz |
| | 0.021052 |
| wavelength | 6 m |
| path loss | 1.85E-21 |
| channel bit rate | 0.5 Kbps |
| mobile terminal G/T | 1 dB/K |
| threshold Eb/No | 2.5 dB |
| external interference | 2 dB |
| pointing loss | 1 dB |
| rain & atmospheric loss | 1 dB |
| required airborne terminal EIRP | 11.2 dB |

Table 2. Exemplary Return Link Budget

In this example, the element gain is assumed to be 5 dB and the gain roll-off with scan angle goes as $\cos^{1.2}(\theta)$. Assuming a typical antenna noise temperature, as commonly known in the art, an exemplary worst case gain (G/T) at beam center is −15 dB/° K. Utilizing the above assumed values, Tables 1 and 2 illustrate exemplary forward and return link budgets. In this example, Table 1 illustrates that the forward link can support a maximum data rate of 64 Kbps using a standard commercial Ku-band transponder having a worst case effective isotropic radiated power (EIRP) of 47 dBW over the coverage area. The link budget accounts for adjacent satellite interference. Table 2 illustrates that an exemplary return link budget for the mobile platform terminal 14, in accordance with the above example, that includes forward link interference from other ground substations 50 would require an EIRP of at least 11.2 dBW to close the link at 500 bps, which allows a 1 dB margin. In this example, each phased array 88 would have a worst-case EIRP of approximately 9.84+10 log(7*0.25)=12.3 dBW if each antenna element 86 radiates 0.25 Watts. It should be noted that the degradation of the link between ground substation(s) 50 and the satellites 30, and the satellites 30 and ground substation(s) 50 on the forward and return links is assumed to be negligible for the large ground based antennas 30 that are typically used in the art.

Referring again to FIG. 2, the beam width of the antenna transmit/receive beam 78 generated by each MESPA antenna 18, as described above, includes a large portion of the geostationary orbit plane of the satellites 30. At high latitudes, the angular separation between satellites 30, as seen by an observer on the ground, is approximately equal to the longitudinal separation of the satellites 30, if the observer is located at roughly the same longitude as the satellites 30. Therefore, two satellites that are spaced, for example, 20° apart in longitude would appear to have an angular separation of roughly 20° from the ground.

In various embodiments, the antennas transmit/receive beams 78, generated by each antenna element array 88, are scanned to a location approximately mid-way between the two outermost satellites 30 with which the MESPA antenna(s) 18 is/are communicating. For example, an antenna element array 88 would be scanned to a location approximately mid-way between the satellites 30A and 30B, shown in FIG. 2. This allows a single mobile platform 10 to communicate with multiple satellites 30 simultaneously, providing redundant signal paths for increased reliability and the ability to geolocate the mobile platform 10, as described below. Alternatively, the antenna transmit/receive beam 78 can be pointed directly at a single satellite 30, for cases when high reliability and geolocation is not required. In other embodiments, multiple antenna arrays 88 on different facets 82 of the same antenna(s) 18 are activated and directed toward different satellites 30.

Beam pointing angles, for each antenna transmit/receive beam 78 generated by each antenna element array 88, can be computed using the mobile platform terminal 14. The beam pointing angles can be computed by knowing the mobile platform position (i.e. latitude, longitude and altitude), attitude (i.e. heading, pitch and roll) from an on-board navigation system (not shown), and the locations or ephemeris of the satellites 30 with which the mobile platform terminal 14 is communicating. Alternatively, more than one antenna facet 82 may be activated to communicate with the satellites 30, when the satellites 30 have a large angular separation. Increased angular separation between satellites improves the accuracy of the geolocation estimate.

In various other embodiments, where the mobile platform 10 does not have an on-board navigation system for controlling the direction of the transmit/receive beams 78, as is the case with many smaller, light weight mobile platforms, a closed loop tracking system can be implemented where each MESPA antenna 18 searches the sky for the correct satellite 30 and then tracks it using receive signal strength indications (RSSI).

In various embodiments, the return link signals 34 transmitted from the mobile platform terminal 14 include message data packets and geolocation data. Transmitting the return link signals 34 from the mobile platform terminal 14 to multiple satellites results in the return link signals 34 being transmitted substantially simultaneously. Therefore, duplicate message data packets can be received by the ground substation 50. In one form, the ground substation 50 utilizes the ground station server 54 to select the best return link signal 34 based on a signal quality estimate, e.g. the receiver signal energy per bit divided by noise power spectral density (Eb/No). In various forms, the ground station server 54 includes the duplicate packet processor 58. The ground station server 54 then receives the multiple data streams from the receivers 46 and utilizes the duplicate packet processor discarded to discard duplicate message data packets. The ground station server 54 then compiles the remaining message data packets to generate a single data stream that may include such things as data, text and, graphical renderings sent from the mobile platform terminal 14.

As previously stated, communication reliability and geolocation capabilities are increased by substantially simultaneously communicating with a plurality of satellites 30. In various embodiments, all the satellites 30, i.e. the transponders of the satellites 30, have substantially overlapping forward link frequencies bands so that the return link signals 34 can effectively be simultaneously transponded through each satellite 30.

Triangulation of the return link signals 34 from the mobile platform terminal 14, when transponded through two or more satellites 30, provides an estimate of the location of the mobile platform 10. To 3-dimensionally locate airborne mobile platforms, i.e. determine the latitude, longitude and altitude, the communication system 26 preferably incorporates at least three satellites 30. To 3-dimensionally locate terrestrial mobile platforms, the communication system 26 preferably incorporates at least two satellites 30 that provide latitude and longitude, while a terrain map can provide the third dimension. By measuring the relative time delays of the transponded return link signals 34 received at the ground substation(s) 50, and knowing the locations of the satellites 30, the station server 54, or any other suitable computer, can determine the location of the mobile terminal 14, i.e. the mobile platform 10, using well established methods and algorithms.

Preferably, a direct sequence spread spectrum waveform is used on the return link signals 34. The return link signals 34 can be spread over a channel bandwidth of up to a full transponder bandwidth, e.g. 27, 36, 54 and 72 MHz. Alternatively, the transponder bandwidth may be divided into multiple smaller channels and each mobile platform 10 assigned to an individual channel, with multiple mobile platforms 10 sharing each channel up to the PSD limit established by the regulatory agencies. The return link signals 34 transmitted from the mobile platform terminal 14 is transponded through the satellites 30 and received by the ground based antennas 42. The receivers 46 then output an estimate of a code phase of each received return link signals 34. The mobile platform 10 is located in 3-dimensions by measuring the code phase time differences between the receivers 46, and triangulating from the known locations of the satellites 30.

As described above, in other alternate implementations of the present disclosure the MESPA antenna 18, or at least one of the MESPA antennas 18 if the mobile platform terminal 14 includes a plurality of MESPA antennas 18, includes a GPS patch antenna that provides positional data, e.g. latitude, longitude and altitude, of the mobile platform 10. This data may be continuously transmitted from the mobile platform 10 on the return link signals 34. The ground station may then relay the positional data to a mobile platform traffic management center or a mobile platform fleet management center.

Heretofore, the communication system 26 has been described in various implementations using satellites in geostationary orbits (GSOs). However, in other embodiments, the communication system 26 can be implemented incorporating any suitable non-geostationary satellite constellation, as long as the antenna(s) 18 has/have continuous visibility to more than one satellite 30.

Figure 5A:
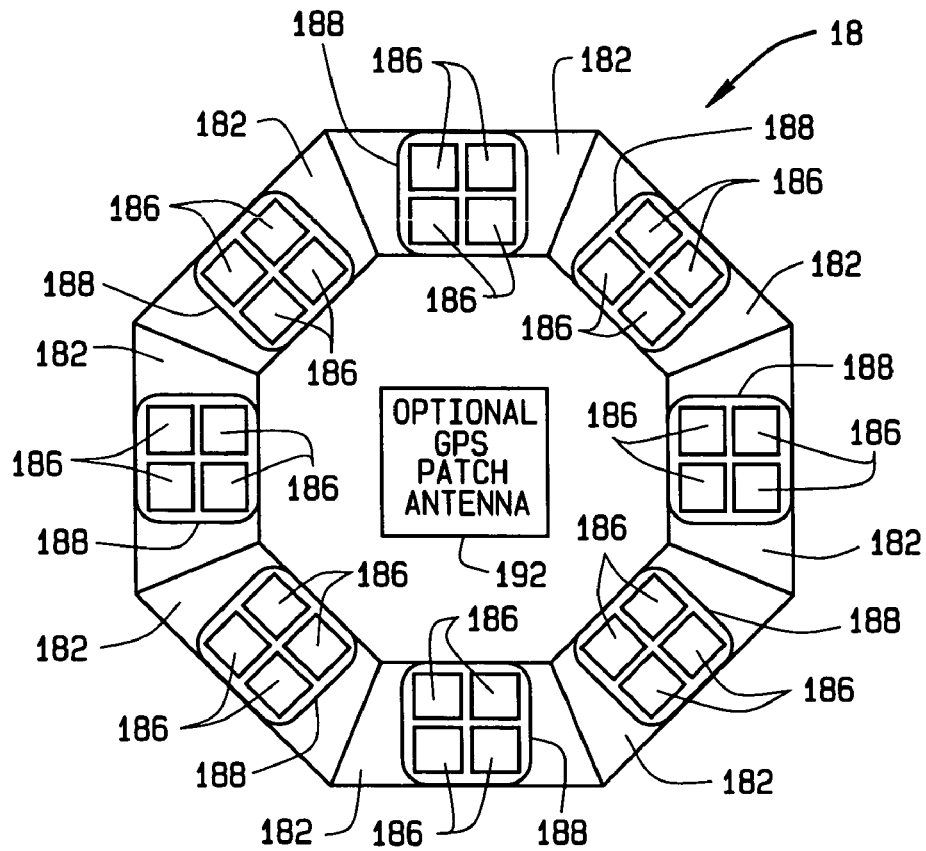
FIG. 5A is a top view of the antenna shown in FIG. 1, in accordance with an alternate embodiments of the present disclosure.
Figure 5B:
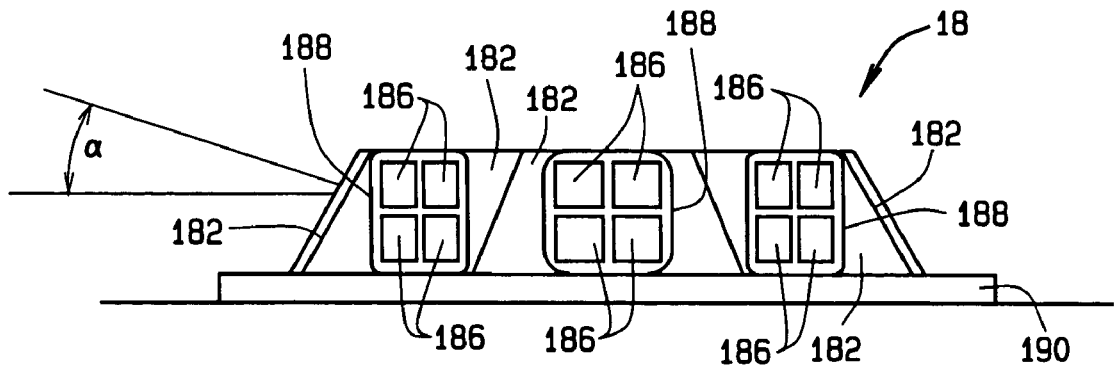
FIG. 5B is a side view of the antenna shown in FIG. 5A.

FIGS. 5A and 5B are respectively a top and side view of the antenna 18, in accordance with various embodiments. In this embodiment, each antenna 18 is a multi-faceted electronically switched scanned (MESS) antenna. Each MESS antenna 18 is mounted on the top of the mobile platform fuselage 19 to achieve an unobstructed view of the satellites 30. Preferably, each MESS antenna 18 is lightweight and small, having a low frontal area to minimize aerodynamic drag. In various embodiments each MESS antenna 18 is an electronically scanned antenna. Each MESS antenna 18 is communicatively connected to the beam steering controller 24 to scan the antenna transmit/receive beams 78, generated by each MESS antenna 18 to the satellites 30. Each MESS antenna 18 includes a plurality of facets 182 that provide hemispheric coverage of the antenna transmit/receive beams 78. Each facet 182 of each MESS antenna 18 preferably includes a plurality of patch elements 186 that form a patch element array 188. The number of facets 182 and the number of patch elements 186 in each patch element array 188, are determined by a desired gain and spatial coverage. In this embodiment, each MESS antenna 18 generates fixed, i.e. staring, antenna transmit/receive beams 78. Beam scanning is accomplished by electronically switching between the element arrays 188 on each facet 182. That is, the beam steering controller 24 controls which facet 182 to activate in order to point the transmit/receive beam 78 in the direction of the mechanical boresight of the facet 182.

In various embodiments each MESS antenna 18 includes nine facets 182 and each patch element array 188 is a 2×2 array of patch elements 186. Each facet 182 is canted at a predetermined angle α from horizontal, for example 30°. The transmit/receive beam 78 generated by each patch element array 188 is pointed in the direction of the mechanical boresight, i.e. perpendicular to the facet 182 surface. The number of facets 182 is selected to provide full hemispheric coverage.

The beam steering controller 24 scans each MESS antenna 18 by activating the facet 182 that points in the direction of a midpoint of the satellites 30. The midpoint is a spot mid-way between the two outer most satellites 30. Each MESS antenna 18 has the capability to electronically scan in azimuth and elevation to track the satellites 30 by activating the patch element array 188 on the facet 182 that has the satellites 30 within its beam width. Each MESS antenna 18 also has the ability to electronically adjust polarization to match that of the satellite transponders with which it is communicating.

Each MESS antenna 18 is suitable for operation within a wide range of frequencies, e.g. between 1 and 100 GHz. In various embodiments, each MESS antenna 18 operates within the Ku-band. In another embodiments, each MESS antenna 18 operates within the Ka-band. In still other embodiments, each MESS antenna 18 operates within the X-band. In still other embodiments, the MESS antenna 18, or one of the antennas 18 if more than one is included in the mobile platform terminal 14, includes a optional GPS patch antenna 194 that can be utilized for tracking the location of the mobile platform 10, as described above.

As described above each MESS antenna 18 is smaller in size than typical known mobile platform electronically scanned phased array antennas. Therefore, the EIRP and G/T of each MESS antenna 18 is lower than typical known mobile platform electronically scanned phased array antennas. For this reason, the data rates of the return link signals 34 and the forward link signals 38, supported by each MESS antenna 18, as described herein, are generally low. For example, using commercially available Ku-band satellite transponders, the data rate for the return link signals 34 can be between 0.5 and 1.0 Kbps, while the data rate of the forward link signals 38 can be between 50 and 75 Kbps.

The geolocation capability of the present disclosure, as described above is advantageously used by mobile platform traffic managers, e.g. schedulers, dispatchers, controllers, etc. as a back-up surveillance mechanism when the on-board navigation system of the mobile platform 10, e.g. GPS and INS., malfunctions. In emergencies, the system could provide navigation information to mobile platform operators, e.g. pilots, and act as a backup to the on-board navigation system when it is not available due to equipment failure, interference, etc.

Furthermore, on-board navigation systems, e.g. GPS and INS, generally achieve better accuracy than the geolocation capability of this disclosure described above. Therefore, it would be advantageous to utilize the messaging capability of the present disclosure to transmit the on-board GPS/INS position and attitude estimates to the ground substation 50. However, for mobile platforms 10 that are not equipped with GPS navigation capability, e.g. many light aircraft, the optional GPS patch antenna, $^{94}/_{194}$ can be used for position and altitude reporting. Therefore, the present disclosure allows for two simultaneous means of mobile platform geolocation, whereby the two geolocation estimates may be crosschecked for accuracy. Additionally, the messaging capability of the system allows the mobile platform 10 to continuously transmit travel data, e.g. flight data, and mobile platform system status information to the ground substation 50.

Thus, the present disclosure provides a satellite communication system for mobile platforms that offers the benefits of small, inexpensive antennas at operating frequencies that correspond to the principal commercial satellite communication bands, e.g. bands above 2 GHz. Moreover, the present disclosure provides communication and geolocation using a much lower data rate, for example, less than 100 Kbps, with a corresponding smaller and less expensive antenna. Furthermore, the smaller, less expensive multi-faceted antennas of the present disclosure limit interference with neighboring satellites while simultaneously using multiple satellites for redundancy and geolocation.

While the present disclosure has been described in terms of various specific embodiments, those skilled in the art will recognize that the present disclosure can be practiced with modification within the spirit and scope of the claims.

The invention claimed is:

1. A method for providing communication and surveillance services to a mobile platform, said method comprising:
   substantially simultaneously communicating between a plurality of ground based antennas and a plurality of satellites, each ground based antenna communicating with a related one of the satellites;
   substantially simultaneously transmitting each of a plurality of return link signals from at least one multi-faceted electronically scanned antenna including a plurality of facets that each include a plurality of signal transmitting patch elements to a different one of the satellites, the multi-faceted electronically scanned antenna included in a mobile platform communication system onboard a mobile platform; and
   steering the return link signals toward the satellites utilizing a beam steering controller of the mobile platform communication system, the controller operable to scan the multi-faceted electronically scanned antenna and continuously determine which facet is active during a specific period of time;
   wherein substantially simultaneously transmitting the return signals from the multi-faceted electronically scanned antenna to the satellites comprises transmitting at least one of messaging data packets and geolocation data via the return link signals;
   the method further comprising substantially simultaneously communicating between the ground based antennas and a ground based substation;
   wherein substantially simultaneously communicating between the ground based antennas and a ground based substation comprises:
   receiving the return link signals at the ground based antennas;
   transmitting the messaging data packets from the ground based antennas to a plurality of receivers, each ground based antenna transmitting the messaging data packets to a related one of the receivers;
   discarding duplicate messaging data packets utilizing a duplicate packet processor communicatively connected to each of the receivers;
   discarding corrupted messaging data packets utilizing the duplicate packet processor; and
   compiling the messaging data packets utilizing the duplicate packet processor.

2. A method for providing communication and surveillance services to a mobile platform, said method comprising:
   substantially simultaneously communicating between a plurality of ground based antennas and a plurality of satellites, each ground based antenna communicating with a related one of the satellites;
   substantially simultaneously transmitting each of a plurality of return link signals from at least one multi-faceted electronically scanned antenna including a plurality of facets that each include a plurality of signal transmitting patch elements to a different one of the satellites, the multi-faceted electronically scanned antenna included in a mobile platform communication system onboard a mobile platform; and
   steering the return link signals toward the satellites utilizing a beam steering controller of the mobile platform communication system, the controller operable to scan the multi-faceted electronically scanned antenna and continuously determine which facet is active during a specific period of time;
   wherein the multi-faceted electronically scanned antenna comprises a multi-faceted electronically scanned phased array (MESPA) antenna and the controller is operable to dynamically scan each facet of the MESPA antenna over a scan range from a boresight of the respective facet;
   wherein steering the return link signals toward the satellites utilizing the beam steering controller comprises:
   generating a transmit/receive beam from the MESPA antenna; and
   steering the transmit/receive beam within the scan range of at least one of the facets to selectively point to a location approximately mid-way between two of the satellites such that the transmit/receive beam encompasses at least two of the satellites.

3. A method for providing communication and surveillance services to a mobile platform, said method comprising:
   substantially simultaneously communicating between a plurality of ground based antennas and a plurality of satellites, each ground based antenna communicating with a related one of the satellites;
   substantially simultaneously transmitting each of a plurality of return link signals from at least one multi-faceted electronically scanned antenna including a plurality of facets that each include a plurality of signal transmitting patch elements to a different one of the satellites, the multi-faceted electronically scanned antenna included in a mobile platform communication system onboard a mobile platform; and
   steering the return link signals toward the satellites utilizing a beam steering controller of the mobile platform communication system, the controller operable to scan the multi-faceted electronically scanned antenna and continuously determine which facet is active during a specific period of time;
   wherein the multi-faceted electronically scanned antenna comprises a multi-faceted electronically switched scanned (MESS) antenna and the controller is operable to sequentially scan each facet in a fixed direction of a boresight of the respective facet;
   wherein steering the return link signals toward the satellites utilizing the beam steering controller comprises generating a transmit/receive beam fixed in the direction of the boresight from the facet having the respective boresight pointing to a location approximately mid-way between two of the satellites such that the transmit/receive beam encompasses at least two of the satellites.

4. A method for providing communication and surveillance services to a mobile platform, said method comprising:
substantially simultaneously communicating between a plurality of ground based antennas and a plurality of satellites, each ground based antenna communicating with a related one of the satellites;
substantially simultaneously transmitting each of a plurality of return link signals from at least one multi-faceted electronically scanned antenna including a plurality of facets that each include a plurality of signal transmitting patch elements to a different one of the satellites, the multi-faceted electronically scanned antenna included in a mobile platform communication system onboard a mobile platform; and
steering the return link signals toward the satellites utilizing a beam steering controller of the mobile platform communication system, the controller operable to scan the multi-faceted electronically scanned antenna and continuously determine which facet is active during a specific period of time;
the method further comprising: substantially simultaneously transmitting a plurality of forward link signals from a plurality of transmitters, each transmitter transmitting an independent one of the forward link signals from a related one of the ground based antennas; and
receiving the forward link signals from the satellites at the multi-faceted electronically scanned antenna;
wherein receiving the forward link signals from the satellites comprises:
providing the multi-faceted electronically scanned antenna to be a MESPA antenna;
dynamically scanning each facet of the MESPA antenna over a scan range from a boresight of the respective facet;
generating a transmit/receive beam from the MESPA antenna; and
steering the transmit/receive beam within the scan range of a selected one of the facets to selectively point to a location approximately mid-way between two of the satellites such that the transmit/receive beam encompasses at least two of the satellites.

5. A method for providing communication and surveillance services to a mobile platform, said method comprising:
substantially simultaneously communicating between a plurality of ground based antennas and a plurality of satellites, each ground based antenna communicating with a related one of the satellites;
substantially simultaneously transmitting each of a plurality of return link signals from at least one multi-faceted electronically scanned antenna including a plurality of facets that each include a plurality of signal transmitting patch elements to a different one of the satellites, the multi-faceted electronically scanned antenna included in a mobile platform communication system onboard a mobile platform; and
steering the return link signals toward the satellites utilizing a beam steering controller of the mobile platform communication system, the controller operable to scan the multi-faceted electronically scanned antenna and continuously determine which facet is active during a specific period of time;
the method further comprising: substantially simultaneously transmitting a plurality of forward link signals from a plurality of transmitters, each transmitter transmitting an independent one of the forward link signals from a related one of the ground based antennas; and
receiving the forward link signals from the satellites at the multi-faceted electronically scanned antenna;
wherein receiving the forward link signals from the satellites comprises:
providing the multi-faceted electronically scanned antenna to be a multi-faceted electronically switched scanned (MESS) antenna;
sequentially scanning each facet in a fixed direction of a boresight of the respective facet; and
generating a transmit/receive beam fixed in the direction of the boresight from the facet having the respective boresight pointing to a location approximately mid-way between two of the satellites such that the transmit/receive beam encompasses at least two of the satellites.

6. A system for providing communication and surveillance services to a mobile platform, said system comprising:
at least one ground based substation adapted to substantially simultaneously communicate with a plurality of ground based antennas;
a plurality of satellites having substantially overlapping forward link frequencies so that return link signals can be substantially simultaneously transponded through each of the satellites;
a mobile platform communication subsystem onboard a mobile platform, the mobile platform communication subsystem comprising at least one multi-faceted electronically scanned antenna including a transmit multi-faceted electronically scanned antenna adapted to substantially simultaneously transmit each of a plurality of return link signals to a different one of the satellites, each return link signal including substantially identical data that includes at least one of messaging data packets and geolocation data, and
a plurality of receivers adapted to receive the message data packets from a related one of the ground based antennas and transmit the message data packets to a duplicate packet processor that discards duplicate message packets, discards corrupted message packets and compiles the remaining data packets.

7. The system of claim 6, further comprising a plurality of receivers adapted to receive the geolocation data from a related one of the ground based antennas and transmit the geolocation data to a geolocation processor that utilizes the geolocation data to triangulate a position of the mobile platform.

8. The system of claim 6, wherein the transmit multi-faceted electronically scanned antenna comprises a multi-faceted electronically scanned phased array (MESPA) antenna.

9. The system of claim 8, wherein the mobile platform communication subsystem includes a beam steering controller adapted to:
continuously dynamically scan each facet of the transmit MESPA antenna over a range of deviation from a boresight of the respective facet; and
steer a transmit/receive beam within the range of deviation of at least one of the facets to selectively point to a location approximately mid-way between two of the satellites such that the transmit/receive beam encompasses at least two of the satellites.

10. The system of claim 8, wherein the mobile platform communication subsystem includes a beam steering controller adapted to:

sequentially scan each facet of transmit MESS antenna in a fixed direction of a boresight of the respective facet; and generate a transmit/receive beam fixed in the direction of the boresight from the facet having the respective boresight pointing to a location approximately mid-way between two of the satellites such that the transmit/receive beam encompasses at least two of the satellites.

11. The system of claim 6, wherein the transmit multi-faceted electronically scanned antenna comprises a multi-faceted electronically switched scanned (MESS) antenna.

12. The system of claim 6, wherein the transmit multi-faceted electronically scanned antenna includes a global positioning satellite (GPS) antenna for reporting mobile platform positional data to the ground based substation.

13. The system of claim 6, wherein the multi-faceted electronically scanned antenna comprises a receive multi-faceted electronically scanned antenna adapted to receive from the satellites a plurality of forward link signals substantially simultaneously transmitted from a plurality of ground based transmitters.

14. The system of claim 13, wherein the receive multi-faceted electronically scanned antenna comprises a multi-faceted electronically scanned phased array (MESPA) antenna, and the mobile platform communication subsystem includes a beam steering controller adapted to:

continuously dynamically scan each facet of the receive MESPA antenna over a range of deviation from a boresight of the respective facet; and steer a transmit/receive beam within the range of deviation of at least one of the facets to selectively point to a location approximately mid-way between two of the satellites such that the transmit/receive beam encompasses at least two of the satellites.

15. The system of claim 13, wherein the receive multi-faceted electronically scanned antenna comprises a multi-faceted electronically switched scanned (MESS) antenna and the mobile platform communication subsystem includes a beam steering controller adapted to:

sequentially scan each facet of the receive MESS antenna in a fixed direction of a boresight of the respective facet; and generate a transmit/receive beam fixed in the direction of the boresight from the facet having the respective boresight pointing to a location approximately mid-way between two of the satellites such that the transmit/receive beam encompasses at least two of the satellites.

16. The system of claim 6, wherein the mobile platform communication subsystem includes a transmit and receive multi-faceted electronically scanned antenna adapted to:

substantially simultaneously transmit a plurality of return link signals to the satellites, each return link signal being substantially simultaneously transmitted to a different one of the satellites; and receive from the satellites a plurality of forward link signals substantially simultaneously transmitted from a plurality of ground based transmitters.

17. A mobile platform communication system comprising:

at least one multi-faceted electronically scanned antenna including a plurality of facets and a plurality of patch elements on each of the facets, the multi-faceted electronically scanned antenna adapted to substantially simultaneously communicate with a plurality of satellites; and a beam steering controller adapted to scan the multi-faceted electronically scanned antenna to a location approximately mid-way between two of the satellites such that a transmit/receive beam generated by the multi-faceted electronically scanned antenna encompasses at least two of the satellites, whereby the transmit/receive beam substantially simultaneously communicates redundant data signals between the multi-faceted electronically scanned antenna and the satellites.

18. The system of claim 17, wherein the multi-faceted electronically scanned antenna comprises a transmit multi-faceted electronically scanned antenna adapted to substantially simultaneously transmit a plurality of redundant return link signals to the satellites, each return link signal being substantially simultaneously transmitted to a different one of the satellites.

19. The system of claim 18, wherein the transmit multifaceted electronically scanned antenna comprises a multi-faceted electronically scanned phased array (MESPA) antenna and the beam steering controller is further adapted to:

continuously dynamically scan each facet of the transmit MESPA antenna over a range of deviation from a boresight of the respective facet; and steer the transmit/receive beam within the range of deviation of at least one of the facets to selectively point to the location approximately mid-way between two of the satellites.

20. The system of claim 18, wherein the transmit multi-faceted electronically scanned antenna comprises a multi-faceted electronically switched scanned (MESS) antenna and the beam steering controller is further adapted to:

sequentially scan each facet of transmit MESS antenna in a fixed direction of a boresight of the respective facet; and steer the transmit/receive beam in a fixed direction of the boresight from the facet having the respective boresight pointing to the location approximately mid-way between two of the satellites.

21. The system of claim 17, wherein the multi-faceted electronically scanned antenna comprises a receive multi-faceted electronically scanned antenna adapted to substantially simultaneously receive from the satellites a plurality of redundant forward link signals.

22. The system of claim 21, wherein the receive multi-faceted electronically scanned antenna comprises a multi-faceted electronically scanned phased array (MESPA) antenna, and the beam steering controller is further adapted to:

continuously dynamically scan each facet of the receive MESPA antenna over a range of deviation from a boresight of the respective facet; and steer a transmit/receive beam within the range of deviation of at least one of the facets to selectively point to the location approximately mid-way between two of the satellites.

23. The system of claim 21, wherein the receive multi-faceted electronically scanned antenna comprises a multi-faceted electronically switched scanned (MESS) antenna and the beam steering controller is further adapted to:

sequentially scan each facet of the receive MESS antenna in a fixed direction of a boresight of the respective facet; and generate a transmit/receive beam fixed in the direction of the boresight from the facet having the respective boresight pointing to a location approximately mid-way between two of the satellites such that the transmit/receive beam encompasses at least two of the satellites.

24. The system of claim 17, wherein the multi-faceted electronically scanned antenna comprises a transmit and receive multi-faceted electronically scanned antenna adapted to:

substantially simultaneously transmit a plurality of redundant return link signals to the satellites, each return link signal being substantially simultaneously transmitted to a different one of the satellites; and substantially simultaneously receive from the satellites a plurality of redundant forward link signals.

* * * * *